(12) United States Patent
S

(10) Patent No.: US 11,971,943 B1
(45) Date of Patent: Apr. 30, 2024

(54) MULTIPLE ACTIONS FOR A WEB BROWSER BOOKMARK

(71) Applicant: SAP SE, Walldorf (DE)

(72) Inventor: Anbusivam S, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/113,712

(22) Filed: Feb. 24, 2023

(51) Int. Cl.
*G06F 16/955* (2019.01)
*G06F 3/04817* (2022.01)

(52) U.S. Cl.
CPC ...... *G06F 16/9562* (2019.01); *G06F 3/04817* (2013.01)

(58) Field of Classification Search
CPC .............. G06F 3/04817; G06F 16/9562
See application file for complete search history.

(56) References Cited

U.S. PATENT DOCUMENTS

| | | | | |
|---|---|---|---|---|
| 11,513,658 B1 * | 11/2022 | Olsen | ................... | H04L 65/612 |
| 2001/0011285 A1 * | 8/2001 | Kanno | ................ | G06F 16/9562 |
| | | | | 715/229 |
| 2007/0033517 A1 * | 2/2007 | O'Shaughnessy | ...... | H04L 67/55 |
| | | | | 715/255 |
| 2009/0281723 A1 * | 11/2009 | Kurata | ............... | G01C 21/3679 |
| | | | | 701/408 |
| 2016/0321261 A1 * | 11/2016 | Spasojevic | .......... | G06F 16/9566 |
| 2019/0188013 A1 * | 6/2019 | Krishna | .................... | G06N 5/04 |
| 2019/0339820 A1 * | 11/2019 | Wu | ........................ | G06N 20/00 |
| 2019/0384622 A1 * | 12/2019 | Chen | ..................... | G06F 3/0484 |
| 2023/0328068 A1 * | 10/2023 | Adur | ..................... | H04L 63/102 |
| | | | | 726/1 |

* cited by examiner

*Primary Examiner* — Mong-Shune Chung
(74) *Attorney, Agent, or Firm* — SCHWEGMAN LUNDBERG & WOESSNER, P.A.

(57) ABSTRACT

In an example embodiment, a framework is provided to allow multiple actions related to a web page to be grouped together in a single bookmark, while still allowing a user to select a specific performed action on the web page associated with the bookmark. For example, a bookmark for an employee page may not just provide the user with the ability to navigate automatically to that employee page, but may also provide the user with the ability to edit or search that employee page, all from a single bookmark.

20 Claims, 6 Drawing Sheets

MULTIPLE ACTIONS FOR A WEB BROWSER BOOKMARK

TECHNICAL FIELD

This document generally relates to web browsers. More specifically, this document relates to multiple actions for a web browser bookmark.

BACKGROUND

Web browsers are software computer (and mobile device) applications that are designed to allow users to interact with web pages. A user opens a web browser and navigates to a web address, and the web browser communicates with a web server associated with the web address to retrieve and display a corresponding web page.

Modern web browsers allow for bookmarks. A user creates a bookmark by navigating to a particular web address, as described above, and then selecting on a bookmark button or otherwise issuing a command to bookmark that particular web address. The web browser then saves the web address, typically along with a title of the corresponding web page (taken, for example, from the web page itself or metadata associated with the web page) as a bookmark, in a group of one or more bookmarks maintained for the user. When the user, in the future, wishes to go back to that particular web site, they do not need to navigate to the web address. They can simply view the available bookmarks from the group of one or more bookmarks and select the one they want. The web browser then automatically navigates to the web address it saved for that selected bookmark.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
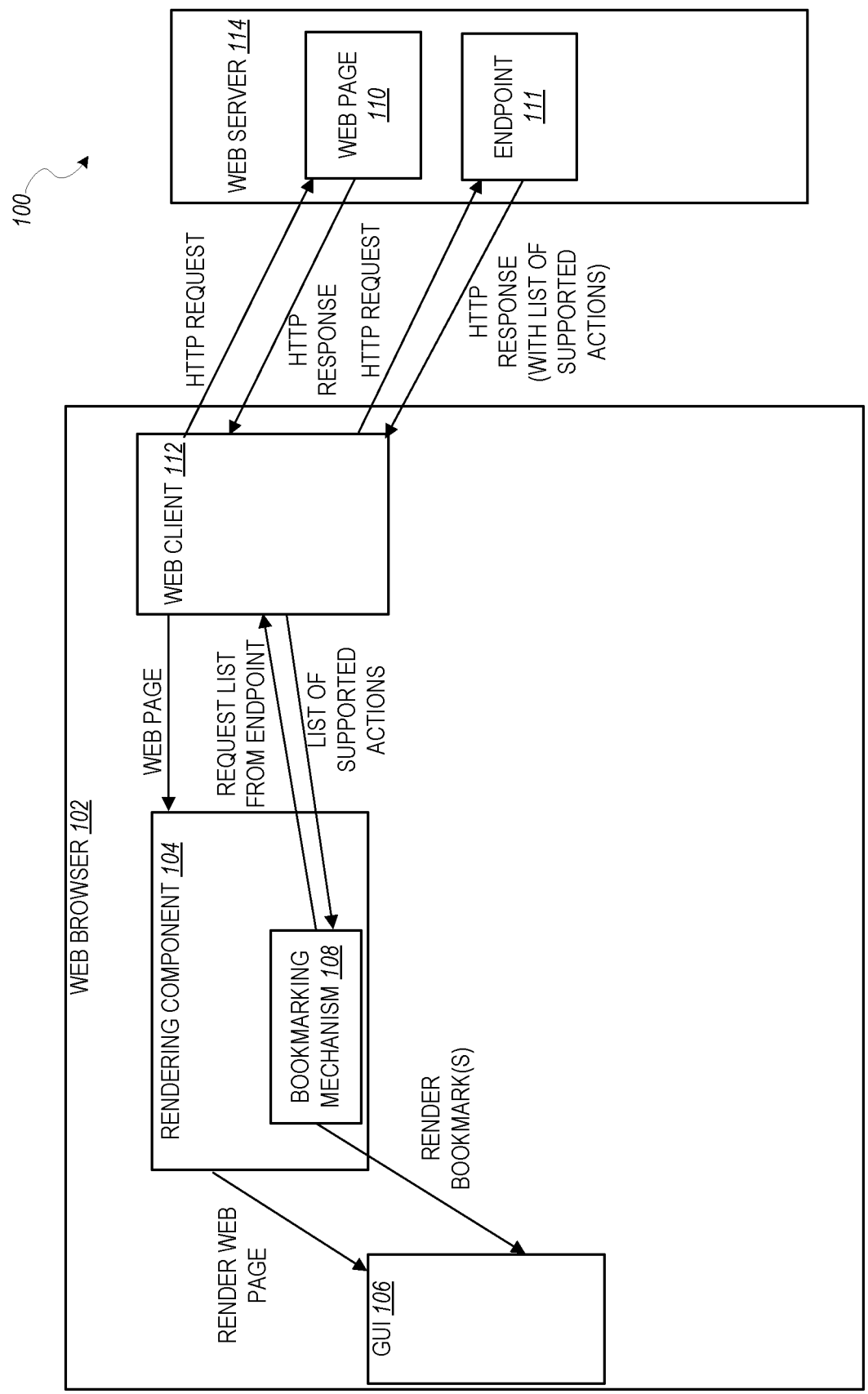
FIG. 1 is a block diagram illustrating a system 100 for providing a plurality of actions on individual bookmarks in a web browser 102, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

The bookmark in a web browser is only useful as a single point of navigation. Specifically, it only provides the user with the ability to perform one "action" as it were, specifically the action to navigate to a web address connected to the selected bookmark. Many modern websites, however, are organized in a hierarchical fashion, and thus there may be many subpages or even portions of a single long web page that a user may wish to revisit over and over again. Currently, a user only has the option of creating a separate bookmark for each web address (whether it be the web address of the web page as a whole or a web address of the specific section of the web page). This can be unwieldly for complex web pages or web sites with many interrelated pages, as the user may wind up with 5, 10, or even 20 different bookmarks for the same web site, or even for the same web page. Furthermore, these bookmarks are treated like any other bookmark, so visually when they are displayed to a user for possible selection, they appear no different than a bookmark to a completely different web site. Additionally, bookmarks are typically organized chronologically based on the date and time they were created, unless manually altered by the user, meaning that if a user creates a bookmark for web page A, then later creates a bookmarks for 10 different web pages, and then even later creates a bookmark for a subheading of web page A, the bookmark for the subheading of web page A will be visually separated in the group of bookmarks from the bookmark of web page A (with the 10 unrelated bookmarks in between them). In order to keep them organized, the user is forced to manually move the bookmark for the subheading of web page A up the list to abut the bookmark for web page A.

Likewise, websites often provide interactive user interface elements, such as buttons, drop downs, etc. that allow the user to request some sort of action be performed. For example, a web page may display a summary of current sales order, and a button may be provided on that web page which, if selected by the user, causes a more detailed view of the current sales order to be displayed. Often these actions may be repeatedly performed by the user, and the user may wish to create a bookmark to perform an action within a web page instead of having to utilize the bookmark from the web page itself and manually request the action be performed each time the bookmarked web page is visited.

In an example embodiment, a framework is provided that allows multiple actions related to a web page to be grouped together in a single bookmark, while still allowing a user to select a specific performed action on the web page associated with the bookmark. For example, a bookmark for an employee page may not just provide the user with the ability to navigate automatically to that employee page but may also provide the user with the ability to edit or search that employee page, all from a single bookmark.

In an example embodiment, icons representing the different available actions for a web page are displayed along with, or even appearing to be inside, the bookmark for that web page. By selecting a particular icon, the user can cause automatic performance of the correct action supported by the web page.

There are multiple ways this feature may be implemented. In a first implementation, each webpage provides a list of supported actions. This supported list may include details like the uniform resource locator (URL) for the action, the corresponding icon, and a description of the action (which may be displayed, as will be seen below, as a tooltip when the user hovers over the corresponding icon). A special endpoint may be established within the web page hierarchy to keep the list of supported endpoints (e.g., <webpageurl>/supportedactions). A web browser may then be designed to know to attempt to locate this supported endpoint whenever it retrieves a web page in the hierarchy associated with that endpoint, and thus have the information available to save if bookmarking is requested.

FIG. 1 is a block diagram illustrating a system 100 for providing a plurality of actions on individual bookmarks in a web browser 102, in accordance with an example embodiment. The web browser 102 includes a rendering component 104, which takes web page code and/or scripts and causes aspects to be rendered in a graphical user interface 106 of the web browser 102. These aspects may include not just aspects of the visited web page itself, but also a menu system that includes a selection, such as a drop down menu, for selecting bookmarks. The bookmarks may be generated by a bookmarking mechanism. 108. The bookmarking mechanism 108 in this example embodiment is designed to, upon a user navigating to a particular web page using the web browser 102, retrieve a list of supported actions for the particular web page 110 from an endpoint 111 associated with the web page. When the user navigates to a web page 110, a web client 112 in the web browser 102 sends an HTTP request, including a web address for the web page (as obtained from a domain name server (DNS) to a web server 114), which returns the web page 110 to the web browser. Either within this HTTP request, or within a separate HTTP request, the bookmarking mechanism 108, via the web client 112, requests the list of supported actions from the endpoint, which may be a subpage of the web page (e.g., located in the same domain as the web page 110 and thus sharing a first portion of the URL of the web page 110 in common).

The bookmarking mechanism 108 then uses this list in determining which icons to display next to or within a bookmark corresponding to the web page 110, should the user select to bookmark the web page. These icons are then rendered by the graphical user interface 106 when the user wants to select a bookmark.

In a second implementation, each webpage provides the list of supported actions as part of a document, such as a hypertext transfer protocol (HTTP) document in a header in a response provided by the webpage. For example, "supported-actino" may be a parameter name and its value could be an array of objects in Javascript Object Notation (JSON) (e.g., [{"actionname": "<name>", "url": "<url>", "iconurl": "<url-to-fetch-icon>, "tooltip": "<tool tip>"}, . . . ]

Figure 2:
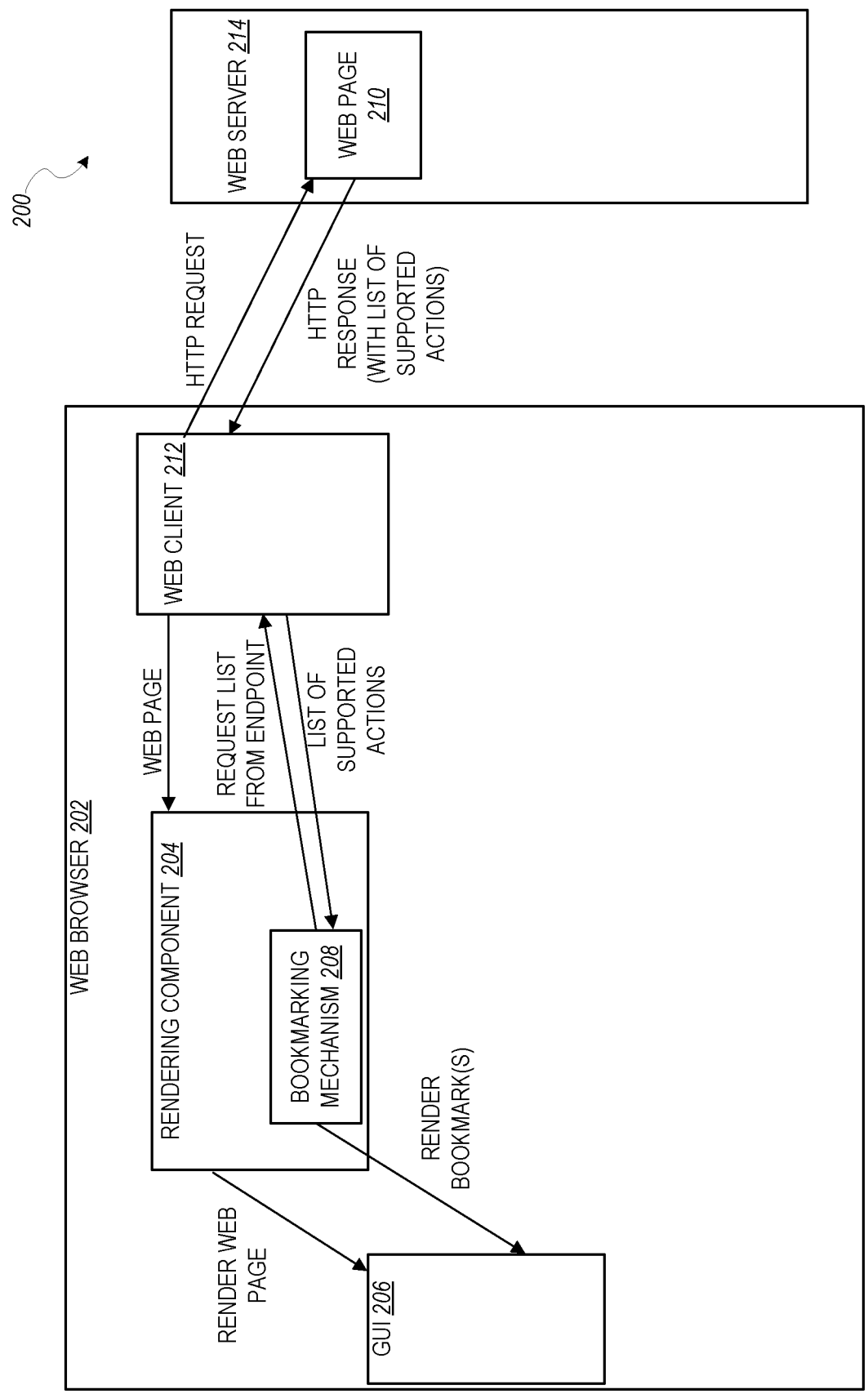
FIG. 2 is a block diagram illustrating a system 200 for providing a plurality of actions on individual bookmarks in a web browser 202, in accordance with another example embodiment.

FIG. 2 is a block diagram illustrating a system 200 for providing a plurality of actions on individual bookmarks in a web browser 202, in accordance with another example embodiment. The web browser 202 includes a rendering component 204, which takes web page code and/or scripts and causes aspects to be rendered in a graphical user interface 206 of the web browser 202. These aspects may include not just aspects of the visited web page itself, but also a menu system that includes a selection, such as a drop down menu, for selecting bookmarks. The bookmarks may be generated by a bookmarking mechanism 208. The bookmarking mechanism 208 in this example embodiment is designed to, upon a user navigating to a particular web page using the web browser 202, receive within the HTTP response that includes the list of supported actions, such as stored in an array that is returned in the header of the HTTP response. Thus, when the user navigates to a web page 210, the web browser 202 sends an HTTP request, including a web address for the web page (as obtained from a domain name server (DNS) to a web server 212, which returns the web page 210 and the list of supported actions to the web browser. The bookmarking mechanism 208 then uses this list in determining which icons to display next to or within a bookmark corresponding to the web page 210, should the user select to bookmark the web page. These icons are then rendered by the graphical user interface 206 when the user wants to select a bookmark.

In a third implementation, the response document contains special HTTP elements designed specifically to provide a list of supported actions, such as:

```
<supportedactions>
    <item>
        <name>Edit</name>
        <url><a style="color: #0563c1;"
        href="http://somebaseurl/edit">http://some-
        baseurl/edit</a> </url>
        <icon><a style="color: #0563c1;"
        href="http://somebaseurl/edit.ico">http://some-
        baseurl/edit.ico</a> </icon>
        <tooltip>Edit employee</tooltip>
    </item>
    <item>
        <name>Display</name>
        <url><a style="color: #0563c1;"
        href="http://somebaseurl/display">http://some-
        baseurl/display</a> </url>
        <icon><a style="color: #0563c1;"
        href="http://somebaseurl/display.ico">http://some-
        baseurl/display.ico</a>
        </icon>
        <tooltip>Display employee</tooltip>
    </item>
</supportedactions>
```

This embodiment may operate on the same system 200 as depicted in FIG. 2, with the supported actions returned in the body of the HTTP response rather than in the header.

The above three implementations provide a mechanism for the web browser to obtain an explicitly defined list of supported actions for a visited web page. In some instances, the explicitly defined list of supported actions may be too long to have each supported action visualized using an icon and still be able to remain within the vicinity of the bookmark itself in a graphical user interface. In other words, it may be desirable to cap the number of displayed supported actions to some number that is less than the size of the list. The result is that it would be beneficial to have a mechanism to automatically reduce the number of displayed supported actions by selecting only a portion of the number of supported actions.

In other instances, the list of support actions may not even be explicitly defined, and there could further be a benefit in having a system where the supported actions for a website may be deduced or inferred. In this case too, however, it would be beneficial to have a mechanism to automatically reduce the number of displayed supported actions by selecting only a portion of the number of supported actions.

The mechanism to reduce the number of displayed supported actions may be, in some example embodiments, implemented using a first machine learning model. The first machine learning model is trained by a first machine learning algorithm to identify the supported actions most likely to be used by a user. In some example embodiments, this may involve the first machine learning model being used to predict a score for a given input supported action, the score indicating the likelihood that a user will select on the input supported action. When a scenario is encountered where the number of supported actions of a particular web page need to be reduced, each of the supported actions of that particular web page can be fed to the first machine learned model, which scores each of those supported actions. The scores may then be used to rank the supported actions and the top n supported actions may then be selected for display as supported actions in the rendered bookmark in the web browser.

The first machine learning model may be trained by any model from among many different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

In an example embodiment, the first machine learning algorithm used to train the first machine learning model may iterate among various weights (which are the parameters) that will be multiplied by various input variables and evaluate a loss function at each iteration, until the loss function is minimized, at which stage the weights/parameters for that stage are learned. Specifically, the weights are multiplied by the input variables as part of a weighted sum operation, and the weighted sum operation is used by the loss function.

In some example embodiments, the training of the first machine learning model may take place as a dedicated training phase. In other example embodiments, the first machine learning model may be retrained dynamically at runtime by the user providing live feedback.

The features used for both training the first machine learning model and evaluating the input supported actions by the trained first machine learning model may include, but are not limited to, features extracted from interaction history of users of web browsers. Specifically, what types of actions users clicked on in individual web pages and how often these actions were clicked on can be measured and used as features. Additionally, in some example embodiments, the first machine learning model may incorporate personalization, where features about individual users are used to better predict which supported actions a particular user may select. For example, users having features similar to user A may be more likely to click on supported actions that user A clicked on rather than actions that user B clicked on, and thus, those users may be displayed as different sets of supported actions than those of users having features similar to user B. Such features may be derived from any available data, such as information found in HTTP headers, like location, IP address, referrer identification, etc. Other potential sources for user-level information include user profiles and/or public databases.

As mentioned above, it may also be beneficial to have a mechanism to infer which supported actions are available for a given web site without it being explicitly provided. In such example embodiments, a deduction engine may be trained by a second machine learning algorithm to deduce, from a given web page, which actions on the web page should be considered as supported. For example, the deduction engine may be trained to parse the code and/or script of the web page and determine any pieces of code that pertain to actions that a user can take on that web page. Certain types of actions, which may be, for example, duplicative, unreliable, dangerous in some way, etc. can be filtered out by the deduction engine.

The deduction engine may be trained by any model from among many different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

In an example embodiment, the second machine learning algorithm used to train the deduction engine may iterate among various weights (which are the parameters) that will be multiplied by various input variables and evaluate a loss function at each iteration, until the loss function is minimized, at which stage the weights/parameters for that stage are learned. Specifically, the weights are multiplied by the input variables as part of a weighted sum operation, and the weighted sum operation is used by the loss function.

In some example embodiments, the training of the deduction engine may take place as a dedicated training phase. In other example embodiments, the deduction engine may be retrained dynamically at runtime by the user providing live feedback.

When the supported actions to display have been identified, and the user selects to bookmark the corresponding web page in the web browser, an icon for each supported bookmark is identified for each supported action to display. Then, when a user wants to select a bookmark, such as by selecting a "bookmarks" menu item or icon, a list of bookmarks, including the bookmark at issue, are rendered in the web browser. The user is then able to select, not just on the bookmark itself, which performs as an ordinary bookmark would in such circumstances and causes the web browser to navigate to the web page itself, but also select on individual actions to perform on the web page, when the user selects on a icon corresponding to an action they wish to perform. All the information necessary for the web browser to run the selected action is saved within the bookmark data structure itself, and thus the web browser is able to quickly request that the action be performed using this information.

In another example embodiment, the users themselves can provide feedback to select and/or alter the selection of supported actions to display. For example, in some example embodiments, each displayed icon corresponding to a supported action has an associated button that can be used to "dismiss" or otherwise remove the supported action from the bookmark. Selecting this associated button may result in the supported action being removed from the bookmark and another supported action replacing it (possibly the next highest ranking non-displayed supported action).

Figure 3:
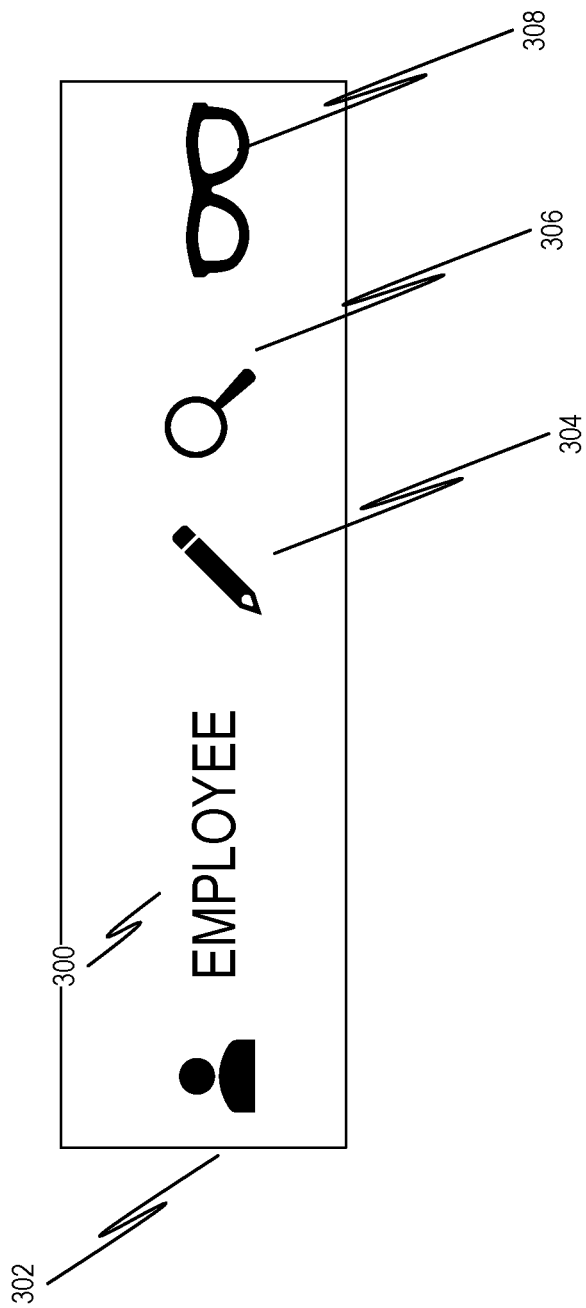
FIG. 3 is a screen capture of a bookmark 300, including a plurality of supported actions, in accordance with an example embodiment.

FIG. 3 is a screen capture of a bookmark 300 including a plurality of supported actions, in accordance with an example embodiment. Here the bookmark 300 is for an employee page. A first icon 302 simply represents the page itself, and is non-selectable, or at least not independently selectable from the rest of the bookmark 300, which the user may select to simply navigate to the employee page itself. A second icon 304, which is selectable, may correspond to a first supported action, such as edit. A user selecting the second icon 304 will cause the web browser to generate a request to edit the corresponding web page, just as if the user had navigated to the web page and selected on an "edit" button. A third icon 306, which is selectable, may correspond to a second supported action, such as search. A user selecting the third icon 306 will cause the web browser to generate a request to search the corresponding web page, just as if the user had navigated to the web page and selected on a "search" button. A fourth icon 308, which is selectable, may correspond to a third supported action, such as display. A user selecting the fourth icon 308 will cause the web browser to generate a request to display a portion of the corresponding web page, just as if the user had navigated to the web page and selected on an "display" button.

While not depicted, in some example embodiments, a user hovering over one of the second icon 304, third icon 306, or fourth icon 308 will cause the web browser to render a tooltip informing the user of the text describing the corresponding supported action. For example, hovering over the second icon 304 will cause the web browser to render a pop-up window to display the word "edit.

Figure 4:
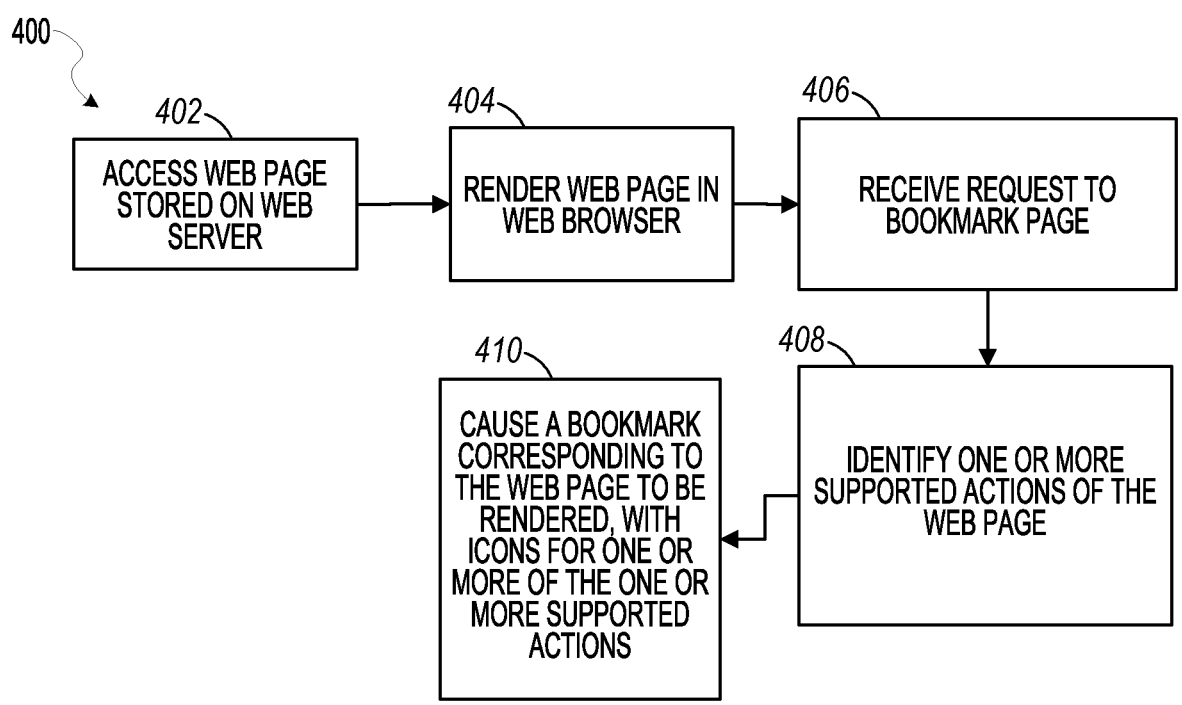
FIG. 4 is a flow diagram illustrating a method 400, in accordance with an example embodiment.

FIG. 4 is a flow diagram illustrating a method 400, in accordance with an example embodiment. At operation 402, a web page stored on a web server is accessed. This may be reformed by the web browser issuing an HTTP request corresponding to the web page to a web address, such as a URL, obtained for the web page from a DNS server. At operation 404, the web page is rendered in a web browser.

At operation 406, a request is received at the web browser from a user to bookmark the web page. At 408, one or more supported actions of the web page are identified. As described in more detail above, these one or more supported actions may be identified in a number of different ways, such as by being expressed in a list at an endpoint, or in the header or body of an HTTP response from the web server.

At operation 410, a bookmark corresponding to the web page is caused to be rendered in the web browser. The bookmark contains an icon for each of one or more of the one or more supported actions, such that a user selecting on an icon in the bookmark will cause the web browser to perform the supported action corresponding to the selected icon.

In view of the disclosure above, various examples are set forth below. It should be noted that one or more features of an example, taken in isolation or combination, should be considered within the disclosure of this application.

Example 1. A system comprising:
at least one hardware processor; and
a computer-readable medium storing instructions that, when executed by the at least one hardware processor, cause the at least one hardware processor to perform operations comprising:
accessing a web page stored on a web server;
presenting the web page in a web browser;
receiving, at the web browser, a request from a user to bookmark the web page;
identifying one or more supported actions of the web page; and
causing presentation, in a graphical user interface of a web browser on a client device, of a bookmark corresponding to the web page, the bookmark containing an icon for each of one or more of the one or more supported actions, such that a user selecting on an icon in the bookmark will cause the web browser to perform the supported action corresponding to the selected icon.

Example 2. The system of Example 1, wherein the identifying one or more supported actions includes:
requesting, by the web browser, a list of supported actions from an endpoint associated with the web page.

Example 3. The system of Examples 1 or 2, wherein the identifying one or more supported actions includes:
receiving, as part of a response from the web server including the web page, a list of supported actions in a header of the response.

Example 4. The system of any of Examples 1-3, wherein the identifying one or more supported actions includes:
receiving, as part of a response from the web server including the web page, a list of supported actions in one or more Hypertext Transfer Protocol (HTTP) elements specifically designed to contain supported actions.

Example 5. The system of any of Examples 1-4, wherein the identifying one or more supported actions includes parsing the web page to identify action elements, wherein each action element corresponds to a potential supported action.

Example 6. The system of any of Examples 1-5, wherein the operations further comprise:
narrowing down the one or more supported actions of the web page to a smaller subset of supported actions using a machine learning model trained by a machine learning algorithm to predict a likelihood of a user selecting on each supported action.

Example 7. The system of Example 6, wherein the machine learning model is a neural network.

Example 8. A method comprising:
accessing a web page stored on a web server;
presenting the web page in a web browser;
receiving, at the web browser, a request from a user to bookmark the web page;
identifying one or more supported actions of the web page; and
causing presentation, in a graphical user interface of a web browser on a client device, of a bookmark corresponding to the web page, the bookmark containing an icon for each of one or more of the one or more supported actions, such that a user selecting on an icon in the bookmark will cause the web browser to perform the supported action corresponding to the selected icon.

Example 9. The method of Example 8, wherein the identifying one or more supported actions includes:
requesting, by the web browser, a list of supported actions from an endpoint associated with the web page.

Example 10. The method of Examples 8 or 9, wherein the identifying one or more supported actions includes:
receiving, as part of a response from the web server including the web page, a list of supported actions in a header of the response.

Example 11. The method of any of Examples 8-10, wherein the identifying one or more supported actions includes:
receiving, as part of a response from the web server including the web page, a list of supported actions in one or more Hypertext Transfer Protocol (HTTP) elements specifically designed to contain supported actions.

Example 12. The method of any of Examples 8-11, wherein the identifying one or more supported actions includes parsing the web page to identify action elements, wherein each action element corresponds to a potential supported action.

Example 13. The method of any of Examples 8-12, further comprising:
narrowing down the one or more supported actions of the web page to a smaller subset of supported actions using a machine learning model trained by a machine learning algorithm to predict a likelihood of a user selecting on each supported action.

Example 14. The method of Example 13, wherein the machine learning model is a neural network.

Example 15. A non-transitory machine-readable medium storing instructions which, when executed by one or more processors, cause the one or more processors to perform operations comprising:
accessing a web page stored on a web server;

presenting the web page in a web browser;

receiving, at the web browser, a request from a user to bookmark the web page;

identifying one or more supported actions of the web page; and causing presentation, in a graphical user interface of a web browser on a client device, of a bookmark corresponding to the web page, the bookmark containing an icon for each of one or more of the one or more supported actions, such that a user selecting on an icon in the bookmark will cause the web browser to perform the supported action corresponding to the selected icon.

Example 16. The non-transitory machine-readable medium of Example 15, wherein the identifying one or more supported actions includes:

requesting, by the web browser, a list of supported actions from an endpoint associated with the web page.

Example 17. The non-transitory machine-readable medium of Examples 15 or 16, wherein the identifying one or more supported actions includes:

receiving, as part of a response from the web server including the web page, a list of supported actions in a header of the response.

Example 18. The non-transitory machine-readable medium of any of Examples 15-17, wherein the identifying one or more supported actions includes:

receiving, as part of a response from the web server including the web page, a list of supported actions in one or more Hypertext Transfer Protocol (HTTP) elements specifically designed to contain supported actions.

Example 19. The non-transitory machine-readable medium of any of Examples 15-18, wherein the identifying one or more supported actions includes parsing the web page to identify action elements, wherein each action element corresponds to a potential supported action.

Example 20. The non-transitory machine-readable medium of any of Examples 15-19, wherein the operations further comprise:

narrowing down the one or more supported actions of the web page to a smaller subset of supported actions using a machine learning model trained by a machine learning algorithm to predict a likelihood of a user selecting on each supported action.

Figure 5:
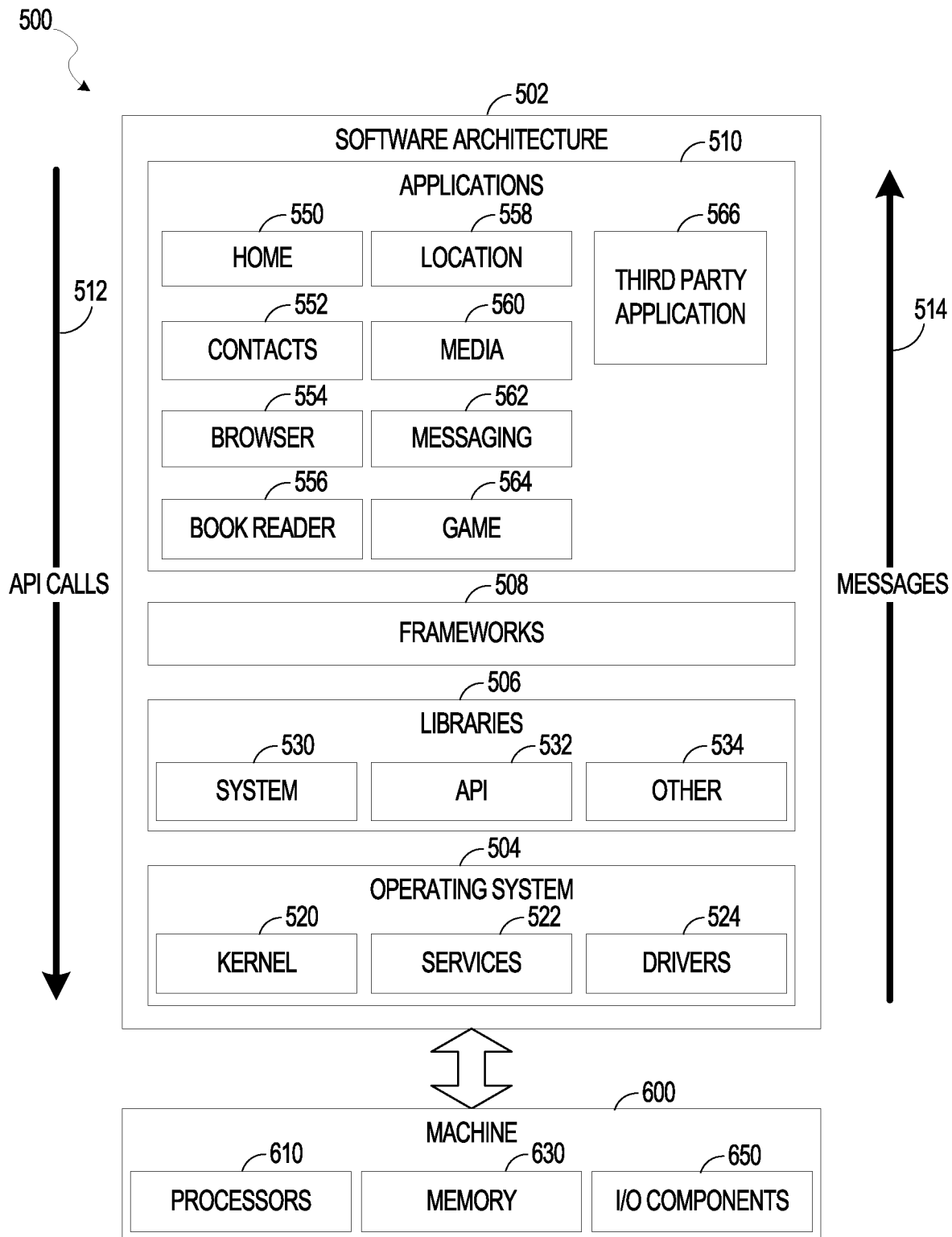
FIG. 5 is a block diagram illustrating an architecture of software, which can be installed on any one or more of the devices described above.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionalities. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions and three dimensions in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphical user interface functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
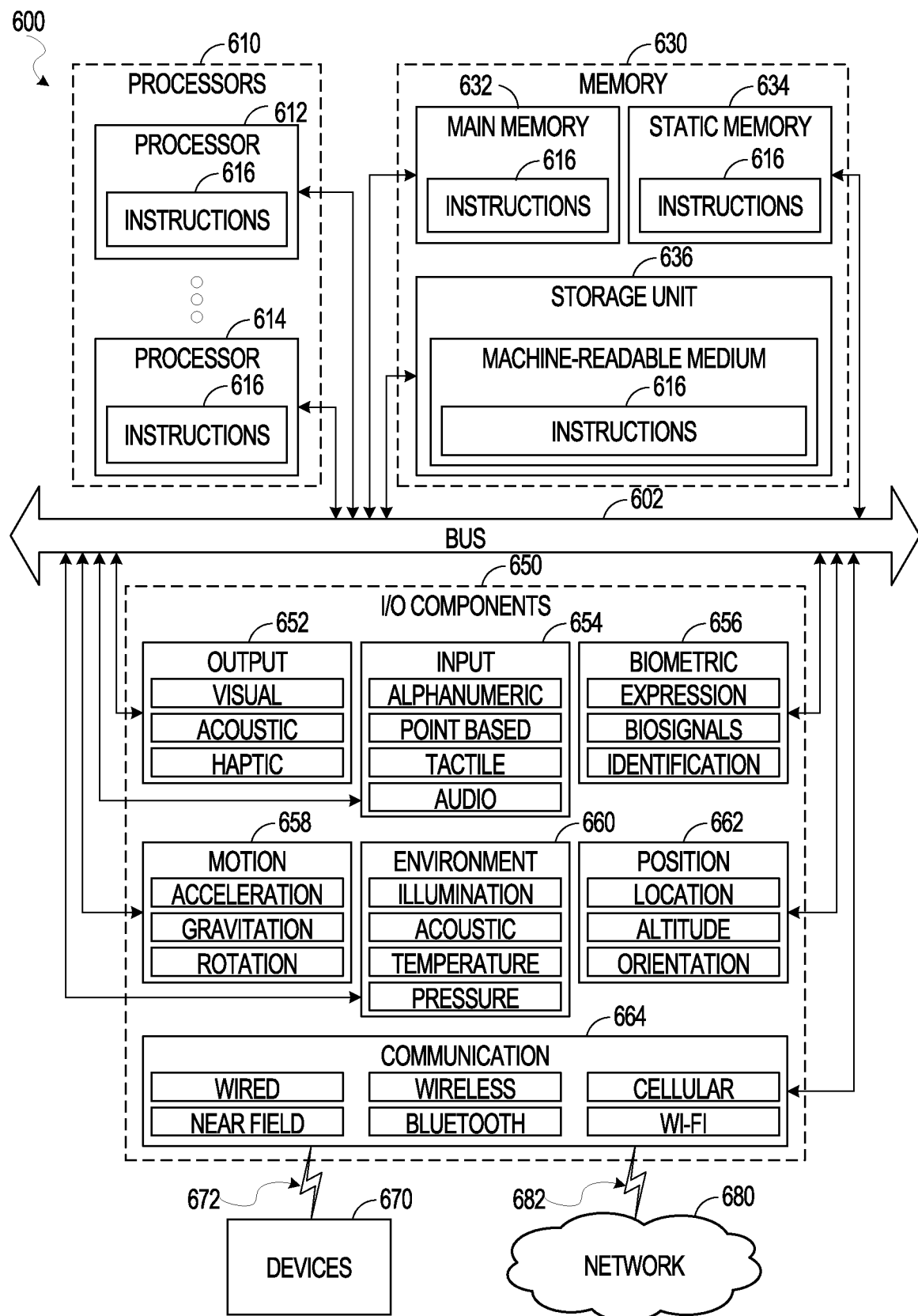
FIG. 6 illustrates a diagrammatic representation of a machine in the form of a computer system within which a set of instructions may be executed for causing the machine to perform any one or more of the methodologies discussed herein, according to an example embodiment.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the methods of FIG. 4. Additionally, or alternatively, the instructions 616 may implement FIGS. 1-4 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

The various memories (e.g., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a non-transitory computer-readable medium storing instructions that, when executed by the at least one hardware processor, cause the at least one hardware processor to perform operations comprising:

accessing a web page stored on a web server;
presenting the web page in a web browser;
receiving, at the web browser, a request from a user to bookmark the web page;
identifying one or more supported actions of the web page, each of the one or more supported actions being an action invoked by a user via interaction with a corresponding user interface element on the web page; and
causing presentation, in a graphical user interface of the web browser on a client device, of a bookmark corresponding to the web page, the bookmark containing an icon for each of one or more of the one or more supported actions, such that a user selecting on an icon in the bookmark will cause the web browser to perform the supported action corresponding to the selected icon.

2. The system of claim 1, wherein the identifying one or more supported actions includes:
requesting, by the web browser, a list of supported actions from an endpoint associated with the web page.

3. The system of claim 1, wherein the identifying one or more supported actions includes:
receiving, as part of a response from the web server including the web page, a list of supported actions in a header of the response.

4. The system of claim 1, wherein the identifying one or more supported actions includes:
receiving, as part of a response from the web server including the web page, a list of supported actions in one or more Hypertext Transfer Protocol (HTTP) elements specifically designed to contain supported actions.

5. The system of claim 1, wherein the identifying one or more supported actions includes parsing the web page to identify action elements, wherein each action element corresponds to a potential supported action.

6. The system of claim 1, wherein the operations further comprise:
narrowing down the one or more supported actions of the web page to a smaller subset of supported actions using a machine learning model trained by a machine learning algorithm to predict a likelihood of a user selecting on each supported action.

7. The system of claim 6, wherein the machine learning model is a neural network.

8. A method comprising:
accessing a web page stored on a web server;
presenting the web page in a web browser;
receiving, at the web browser, a request from a user to bookmark the web page;
identifying one or more supported actions of the web page, each of the one or more supported actions being an action invoked by a user via interaction with a corresponding user interface element on the web page; and
causing presentation, in a graphical user interface of the web browser on a client device, of a bookmark corresponding to the web page, the bookmark containing an icon for each of one or more of the one or more supported actions, such that a user selecting on an icon in the bookmark will cause the web browser to perform the supported action corresponding to the selected icon.

9. The method of claim 8, wherein the identifying one or more supported actions includes:
requesting, by the web browser, a list of supported actions from an endpoint associated with the web page.

10. The method of claim 8, wherein the identifying one or more supported actions includes:
receiving, as part of a response from the web server including the web page, a list of supported actions in a header of the response.

11. The method of claim 8, wherein the identifying one or more supported actions includes:
receiving, as part of a response from the web server including the web page, a list of supported actions in one or more Hypertext Transfer Protocol (HTTP) elements specifically designed to contain supported actions.

12. The method of claim 8, wherein the identifying one or more supported actions includes parsing the web page to identify action elements, wherein each action element corresponds to a potential supported action.

13. The method of claim 8, further comprising:
narrowing down the one or more supported actions of the web page to a smaller subset of supported actions using a machine learning model trained by a machine learning algorithm to predict a likelihood of a user selecting on each supported action.

14. The method of claim 13, wherein the machine learning model is a neural network.

15. A non-transitory machine-readable medium storing instructions which, when executed by one or more processors, cause the one or more processors to perform operations comprising:
accessing a web page stored on a web server;
presenting the web page in a web browser;
receiving, at the web browser, a request from a user to bookmark the web page;
identifying one or more supported actions of the web page, each of the one or more supported actions being an action invoked by a user via interaction with a corresponding user interface element on the web page; and
causing presentation, in a graphical user interface of the web browser on a client device, of a bookmark corresponding to the web page, the bookmark containing an icon for each of one or more of the one or more supported actions, such that a user selecting on an icon in the bookmark will cause the web browser to perform the supported action corresponding to the selected icon.

16. The non-transitory machine-readable medium of claim 15, wherein the identifying one or more supported actions includes:
requesting, by the web browser, a list of supported actions from an endpoint associated with the web page.

17. The non-transitory machine-readable medium of claim 15, wherein the identifying one or more supported actions includes:
receiving, as part of a response from the web server including the web page, a list of supported actions in a header of the response.

18. The non-transitory machine-readable medium of claim 15, wherein the identifying one or more supported actions includes:
receiving, as part of a response from the web server including the web page, a list of supported actions in one or more Hypertext Transfer Protocol (HTTP) elements specifically designed to contain supported actions.

19. The non-transitory machine-readable medium of claim 15, wherein the identifying one or more supported actions includes parsing the web page to identify action elements, wherein each action element corresponds to a potential supported action.

20. The non-transitory machine-readable medium of claim 15, wherein the operations further comprise:
   narrowing down the one or more supported actions of the web page to a smaller subset of supported actions using a machine learning model trained by a machine learning algorithm to predict a likelihood of a user selecting on each supported action.

* * * * *